March 14, 1933.  A. L. GALUSHA  1,901,807
GAS PRODUCER
Filed Dec. 27, 1927   4 Sheets-Sheet 3

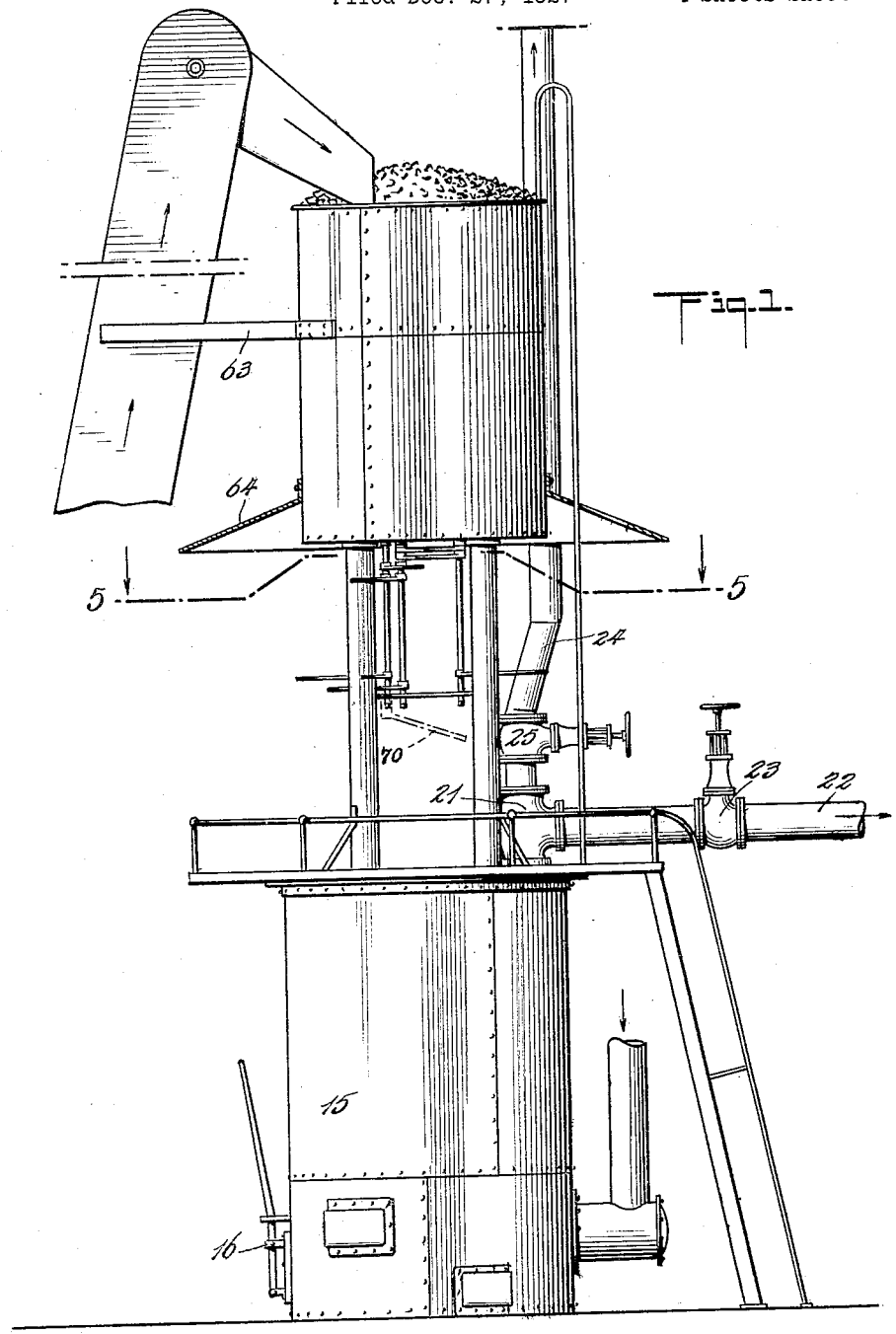

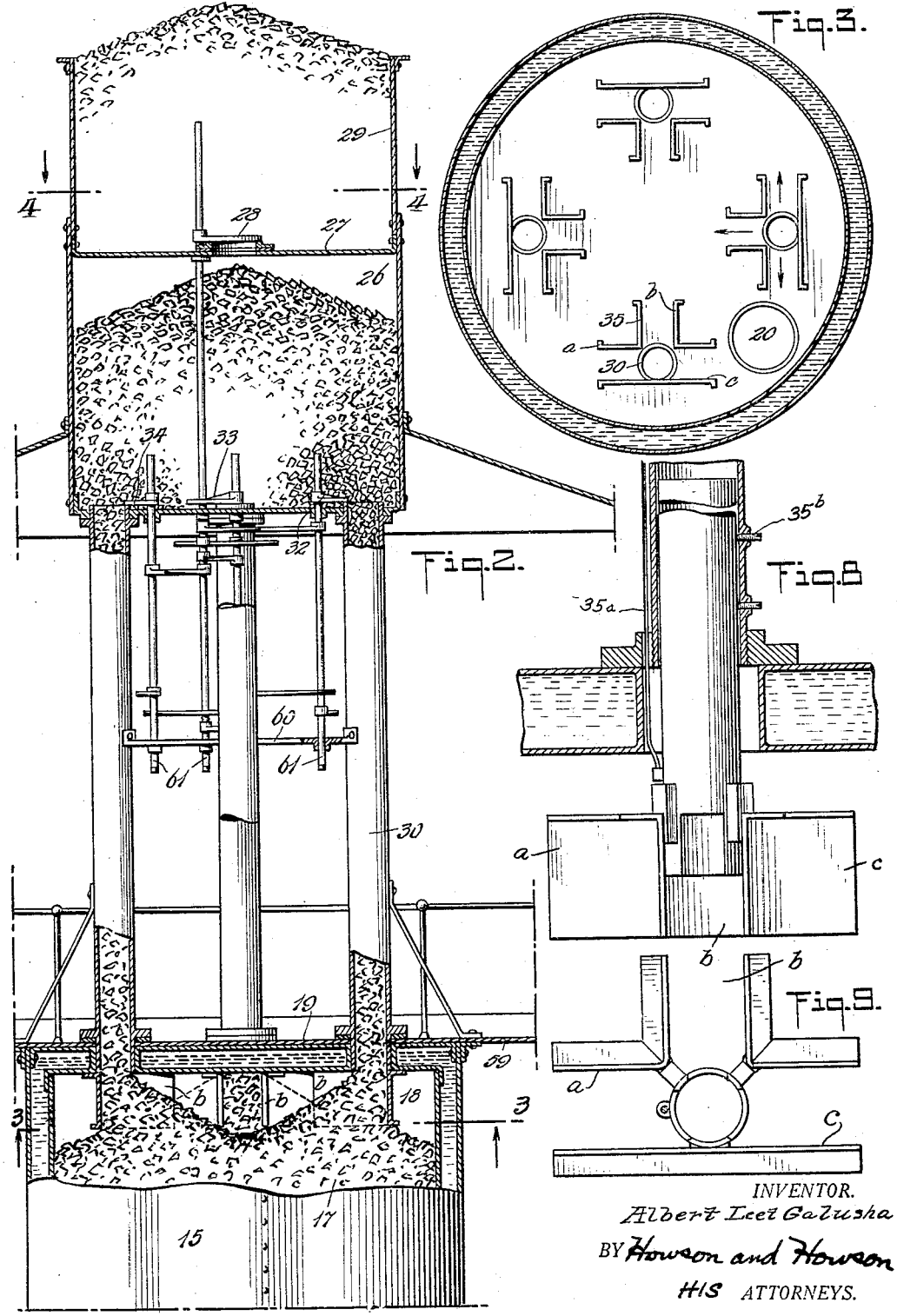

INVENTOR.
Albert Lee Galusha
BY Howson and Howson
HIS ATTORNEYS.

March 14, 1933.  A. L. GALUSHA  1,901,807
GAS PRODUCER
Filed Dec. 27, 1927  4 Sheets-Sheet 4

INVENTOR
Albert Lret Galusha
BY Howson and Howson
HIS ATTORNEYS

Patented Mar. 14, 1933

1,901,807

UNITED STATES PATENT OFFICE

ALBERT LEET GALUSHA, OF CALDWELL, NEW JERSEY

GAS PRODUCER

Application filed December 27, 1927. Serial No. 242,751.

My invention relates to gas producers, and particularly to improvements in operation and construction thereof, which result in marked economies from the standpoint of structure, maintenance and operation, and at the same time increase the efficiency of the apparatus.

In the accompanying drawings—

Fig. 1 is a broken side elevation of a gas producer in which my invention is embodied in one form;

Fig. 2 is a similar view at an angle of 45° to Fig. 1, and drawn to a larger scale;

Fig. 3 is a section on the line 3—3, Fig. 2;

Fig. 8 is a vertical section of an adjustable feed nozzle drawn to a larger scale; and Fig. 9 is an inverted plan view thereof.

Figure 4:
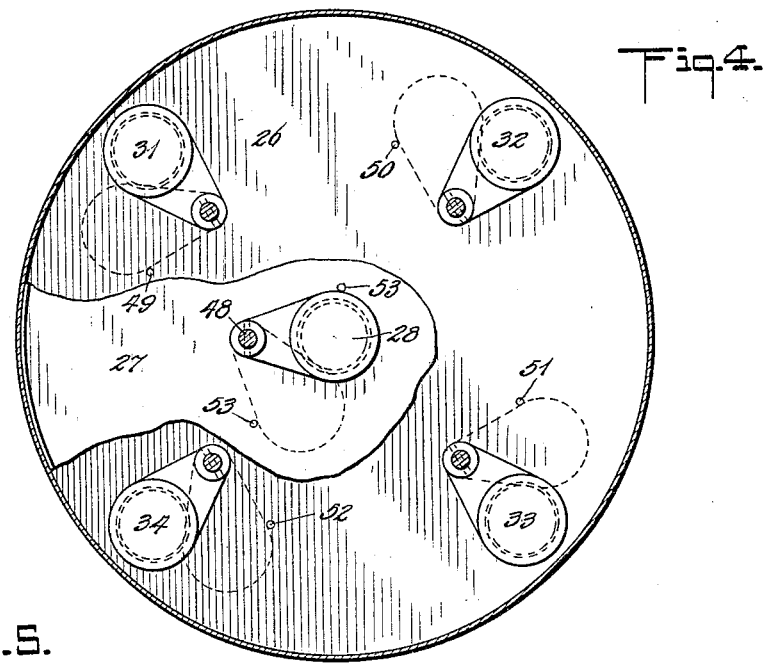
Fig. 4 is a broken section on the line 4—4, Fig. 2.

My invention may be applied advantageously to various gas producer layouts, but is particularly valuable for that type of gas producer used in industrial plants. Inasmuch as my invention is applicable to various makes of producers of this type, I have indicated the structure more or less diagrammatically with the understanding that such adaptations as may be advantageously made in applying my invention to other producer constructions, fall within the scope of my invention.

As here shown the producer proper comprises a water-jacketed steel casing or shell 15, in the lower portion of which is arranged a grate 16 for the support of a relatively deep fuel bed 17 (Fig. 2). A gas-collecting space or chamber 18 is afforded between the head 19 of the producer and the top of the fuel bed, to which space opens the gas outlet port 20 (Fig. 3) in the head 19 of the producer. A T-fitting 21 at this port connects with the gas offtake pipe 22 controlled by gate valve 23, and also with vent stack 24 controlled by gate valve 25. It will be understood that under normal operating conditions the vent stack 24 is closed, and the gas offtake 22 is open.

While a suction fan may be associated with the gas offtake 22 for delivery of producer gas to its point of use under desired pressure, the features of construction hereinafter mentioned make it practical to utilize a forced draft through the fire bed in the producer, air under pressure being supplied through pipe 65 by a suitable blower (not shown) thus causing the gas to gather under pressure in the chamber or space 18 and automatically pass through the offtake line 22 to the point of use. An automatic control of the forced draft (not shown) may be utilized to maintain the gas pressure constant in the offtake line 22.

Ordinarily the fuel bed of producers of this general type is replenished by small charges intermittently introduced several times per hour by hand-operated charging devices, or by power driven feeders. Both are objectionable by reason of their expense. Both fail to provide a level top and constant depth for the fuel bed. Both create a large amount of dust in the gas chamber 18, with the result that the dust is carried over into the gas offtake by the producer gas. Neither affords any facility for automatically varying the depth of the fuel bed. Mechanically operated feeders are subject to rapid wear, with consequent leakage, and require frequent repair.

My invention contemplates a fuel feed to the producer which is not only continuous but also quiet and free from dust, maintains a level fire bed of uniform depth even though the fire burns more rapidly in one part than in another, and is readily altered to vary the depth of the fuel bed on the grate.

In the layout illustrated I have shown an overhead feed bin 26 sealed by partition 27 and valve 28 from the open storage bin 29 superposed on the feed bin 26. Both feed bin and storage bin are supported upon the producer but elevated some distance above it and spaced therefrom by a plurality of tubular pillars 30, of which four are shown—their number, however, being varied as desired. These tubular pillars 30 form feed chutes which at their lower ends are constantly open to the fuel chamber of the producer 15. At their upper ends the chutes have associated valves 31, 32, 33, 34 by which they may be sealed from the bin 26. Under operating conditions the several valves 31, 32, 33, 34 are open and permit the fuel to flow down by gravity through the feed chutes to the producer as the fuel in the latter is consumed, while the storage bin valve 28 is closed to seal the feed bin 26 against the escape of gas to atmosphere. When the fuel of the feed bin 26 needs replenishing from the storage bin 29, the chute valves 31, 32, 33, 34 are closed to seal the producer gas from the feed bin 26, while valve 28 is opened to admit thereto a fresh supply of fuel from the storage bin 29.

The size of the feed bin 26 will vary to meet the demands of the producer. It is practical, however, to make it of such size as to contain a sufficient supply of fuel to feed the producer for a prolonged period—say for a complete working day, or several days, so that the fuel feed to the producer will need attention only at infrequent intervals. It is obvious that when the feed bin is cut off from the chutes by the closing of valves 31, 32, 33, 34, a sufficient supply of fuel remains in the chutes to continue the feed to the producer during the period of refill of the feed bin from the storage bin 29, without in any way interrupting the operation of the producer. A continuous feed is thus afforded.

It is further obvious that the fuel feed to the producer is not only continuous, but quiet, that is to say a slow "solid stream" feed as distinguished from the usual intermittent scattered charge dump. The fines and dust contained in the fuel are thus in large part buried in the solid stream flow and are not freed or scattered into the draft of hot gas and are not carried by the latter into the offtake pipe 22.

Moreover the feed through each chute 30 is independent and proceeds automatically in accordance with the requirements of the fuel bed beneath each chute. Consequently if the fire bed is consumed more rapidly in one area than another, the feed through the chute which delivers to that area of the bed is more rapid than that through the remaining chutes, and the fire bed is thus maintained level and of substantially uniform depth regardless of uneven combustion.

In order to automatically obtain a level-top fire bed in the producer, the lower or discharge end of each chute is shaped to distribute the fuel. While the use of a plurality of feed chutes spaced around the top of the producer greatly improves conditions over the customary single central feed, I have found that in a producer having an inside diameter of say 8 or 9 feet, provided with four feed chutes, the fuel level in the producer—even with a solid stream feed—varies from 12" to 15"—that is to say the height of the cones which form beneath the discharge mouths of the several feed chutes, is from 12" to 15". This condition is greatly improved if the discharge ends of the chutes are provided with distributors, such as indicated in Fig. 3, which may be termed "distributor nozzles" 35. These distributors have lateral branches $a$, $b$, $c$ which are directed to portions of the fuel bed remote from the axis of the feed chute. The branches open laterally moreover, to the feed chute above the bottom of the latter, so that the fuel passing therethrough reaches its angle of repose at a point spaced further from the vertical axis of the feed chute than that which escapes the lower margin of the nozzle. A much closer approximation to a uniform level is thus attained throughout the area of the fuel bed on the grate than is otherwise the case, and a more uniform draft through the fuel bed is thus assured.

The distributing nozzles 35, while forming continuations of the chutes 30, are preferably independent thereof as indicated in Fig. 8, and may be lifted or lowered to locate the fuel bed level a greater or less distance below the producer head 19 and thus afford a deeper or shallower fuel bed and a correspondingly smaller or larger gathering chamber 18 for the producer gas.

By reason of the depth of the fuel bed I have found that the temperature in the gas chamber 18 is not high enough under ordinary conditions to injure unprotected metal nozzles, particularly in view of the fact that the latter are constantly cooled, not only by the flow of fresh fuel therethrough, but also by the water-jacketed casing of the producer head through which the upper portions of the nozzles pass. However, if desired, these nozzles may be water cooled, or they may be made of refractory material. Any suitable means for vertically adjusting the same with respect to the chutes 30 may be provided, for example, a lifting rod $35^a$ and set screws $35^b$.

It is essential to the safe operation of the feeder that means be provided to prevent simultaneous opening of the valve 28 and the valves 31, 32, 33, 34—a condition which would permit the producer gas to escape through the storage bin 29. For this purpose I have provided a series of sectors 36, 37, 38, 39, secured to the shafts 40, 41, 42, 43 by which the several valves 31, 32, 33 and 34 are operated, said sectors cooperating with sectors 44, 45, 46, 47 mounted on the shaft 48 by which the valve 28 is operated.

Figure 5:
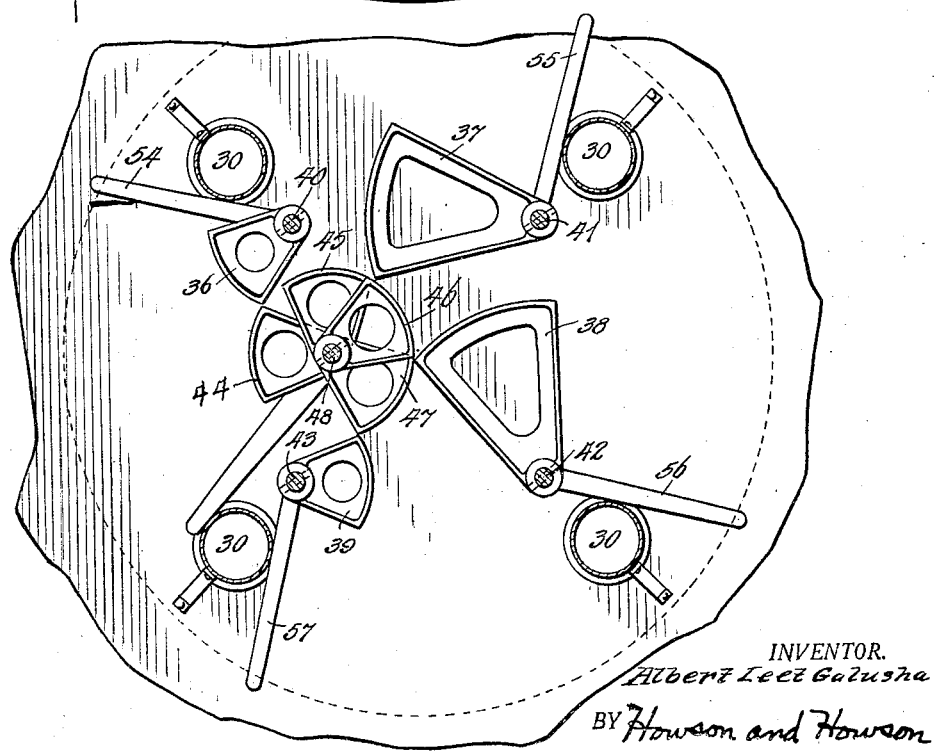
Fig. 5 is a section on the line 5—5, Fig. 1.
Figure 6:
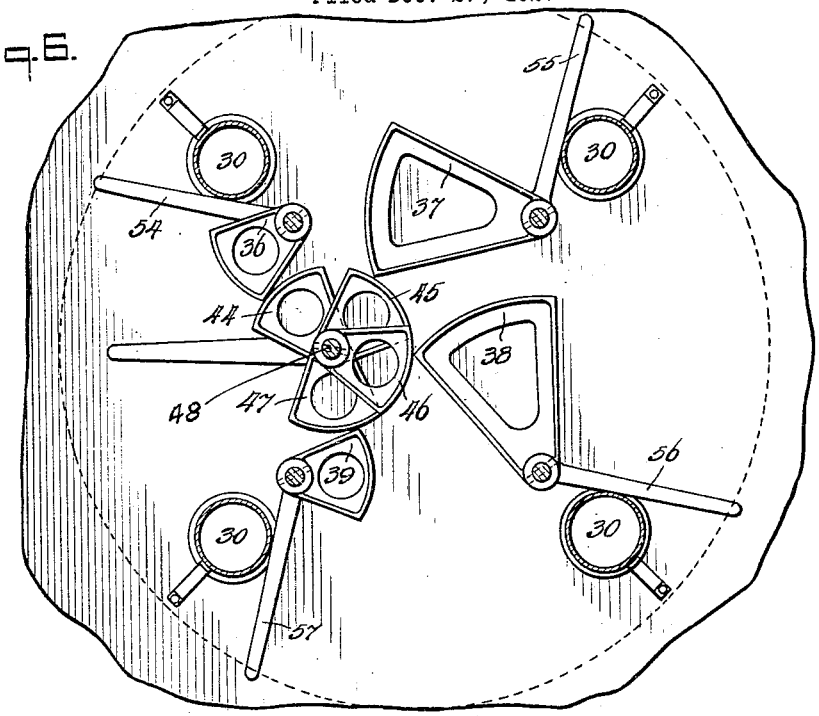
Figs. 6 and 7 are views similar to Fig. 5, but showing the parts in different position.
Figure 7:
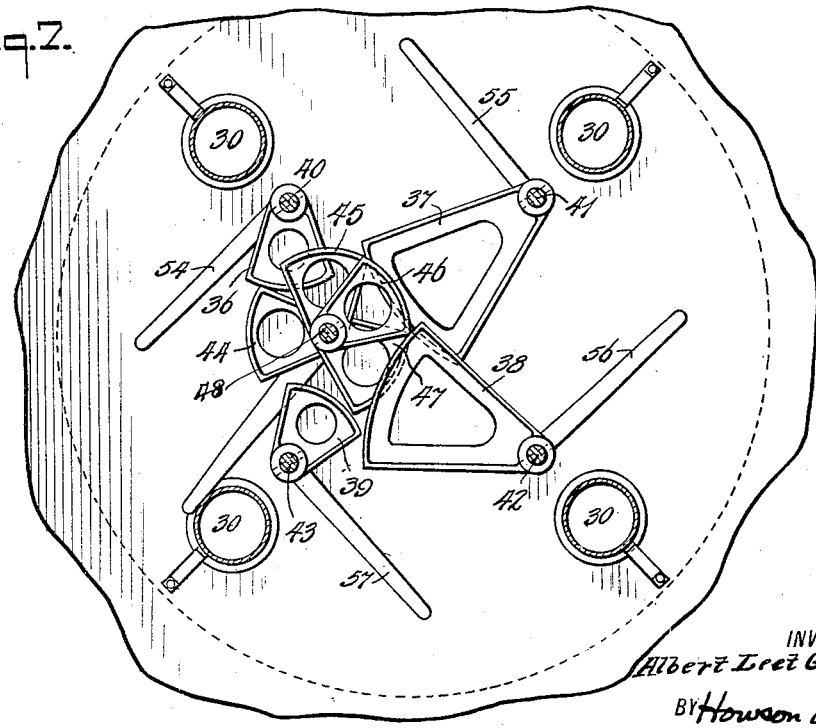

In Fig. 4, I have shown all of the valves in closed position, and in Fig. 5 the interlocking segments are shown in the position which they occupy with the valves in this position. It will be clear from this figure that when the parts are in this position the sealing valve 28 may be moved to open position (Fig. 6) for the re-charging of the feed bin 26 from the storage bin 29, but that when the sealing valve 28 has been thus opened it is impossible to open the chute valves 31, 32, 33, 34, since their respective segments 36, 37, 38, 39 are now each obstructed by the sectors 44, 45, 46, 47 on the shaft 48 of the valve 28 (see Fig. 6). It will also be clear that when the sealing valve 28 has been closed again, it is possible to open one or all of the chute valves 31, 32, 33, 34 (see Fig. 7), but that when all or any one of the latter are opened, it is then impossible to open the sealing valve 28, since one or all of its segments 44, 45, 46, 47 is or are opposed by one or all of the segments 36, 37, 38, 39 on the shafts 40, 41, 42, 43 of the chute valves (see Fig. 7).

When using interlocking segments of this type, it is necessary in order to maintain the latter in proper cooperating relation that some suitable means be provided to limit the arcuate movement of the parts. For this purpose I provide stop pins 49, 50, 51, 52 (Fig. 4), which cooperate with the chute valves to limit their throw, and a stop pin 53 cooperating with the bin valve 28 to limit its throw in one direction. A convenient limit to their throw in the opposite direction is afforded by the operating handles 54, 55, 56, 57 of the several shafts 40, 41, 42, 43 for the chute valves, these handles being so located on the several shafts that in closed valve position the handles are halted by the several chutes 30. A stop pin 58 halts the bin valve 28 in closed position.

An interlock of this character makes it impossible to open the bin sealing valve 28 when any of the chute valves is open, while it is possible when the bin valve 28 is closed to open any or all of the chute valves either completely or partially, as may be desired. I do not limit my invention to this particular interlocking mechanism, but I have found it efficient and simple, not likely to get out of order, and fool proof. It will be noted that the locking segments on the several shafts are all located close beneath the feed bin 26, while the operating handles are located adjacent the lower ends of the several shafts in a position readily accessible to an attendant standing on the platform 59 at the head of the producer. In addition to the operating handles I prefer also to carry the lower ends of the several operating shafts below the bearing bracket 60 in which the shafts are journalled, and shape these lower ends for operation by a detachable crank or operating bar 70 (Fig. 1) which may be slipped over the projecting lower ends 61 of the several shafts.

Any suitable means may be provided for filling the storage bin 29, for example, a scoop conveyor 62, diagrammatically illustrated in Fig. 1, and supported at its upper end by a bracket 63 attached to the storage bin. A roof or like shelter 64 may be secured to the feed bin for protection of the operator on the platform 59.

From the standpoint of structure it will be noted that but a single foundation is necessary for the support of the producer, feed bin, storage bin and roof, inasmuch as the feed and storage bins are supported by the chutes 30 from the producer itself, and the roof structure 64 in turn is carried by the feed bin. It may also be pointed out that any gas leakage that may occur is well above the working platform for the operator. That is to say, the joints between the producer head and the chutes 30 may be readily sealed and since there are no moving parts at this point, no gas leakage can occur in this area. Such leakage as may result from looseness of the valve 28 is well above even the roof 64, and resultant leakage through the storage bin 29 will cause no annoyance to the operator. It may be pointed out moreover that the valve 28, located as it is above the diaphragm 27 which seals the top of the feed bin 26, is readily accessible for repair when the hopper 29 is empty. It will be observed, furthermore, that this valve is held to its seat by the weight of the storage fuel, which thus aids in maintaining the valve sealed. It will be noted also that the location of all the valves, either in the feed bin 26 or in the storage bin 29, both well removed above the producer proper, insures the maintenance of these parts in cool condition, and thus free from the danger of leakage due to expansion.

With the understanding that the layout illustrated embodies my invention merely by way of example, and that various modifications and changes may be made without departing from the thoughts which underlie what I claim as my invention, I claim—

1. In an apparatus for manufacturing producer gas a gas producer, fuel feed chutes rising from the top of said producer, a fuel feed bin supported by the chutes and spaced from said producer, a storage bin superposed on said feed bin, shut-off valves for sealing the feed bin from the storage bin and the feed chutes from the feed bin, and valve controlling means located between said producer and feed bin and accessible from the top of said producer for moving said valves.

2. In combination with a gas producer, a feed bin, feed chutes leading therefrom to the gas producer, a storage bin above the feed bin, valve means for sealing the storage bin from the feed bin, and the feed bin from the chutes, together with interlocking means preventing the opening of any one of the feed chute valves while the storage bin is open to the feed bin.

3. In combination with a gas producer, a feed bin over said producer and spaced therefrom, normally filled feed chutes extending directly therefrom through the head of the producer and opening to the interior of the latter substantially below the head of the producer to provide a gas accumulating space between the head of the producer and the top of the fuel bed maintained by the solid stream fuel feed through the feed chutes.

4. In combination with a gas producer, a feed bin over said producer and spaced therefrom, normally filled feed chutes extending therefrom through the head of the producer and opening to the latter substantially below the head of the producer to provide a gas accumulating space between the head of the producer and the top of the fuel bed, said chutes being provided at their lower ends with dispersing nozzles to insure a substantially level fuel bed spaced from the head of the producer by the continuous solid stream feed through the chutes.

5. In combination with a gas producer, a normally filled feed chute opening through the top of the producer and extending below said top into the producer to provide a gas accumulating space therein, an overhead feed bin to which said chute opens at the upper end thereof, valve means for controlling said chute at its connection to the feed bin, and valve-operating means accessible from the head of the producer.

6. The combination with a gas producer, of an overhead feed bin providing a working space between said bin and gas producer, spaced continuous normally filled feed chutes supporting said feed bin and extending from said feed bin through the head of said producer to the fuel bed thereof and normally providing continuous fuel columns between said feed bin and the fuel bed of the gas producer, valves preventing the flow of gas from said chutes to said feed bin and operating means for said valves projecting into the working space between said feed bin and gas producer.

7. In an apparatus for the manufacture of producer gas, a gas producer, a feed bin over said producer and spaced therefrom, a storage bin superposed on said feed bin, normally filled continuous feed chutes of considerable length leading from the feed bin to the producer, said feed bin having a capacity sufficient to feed the producer during a prolonged period of operation, and the feed chutes having a capacity sufficient to feed the producer during the period of refill of the feed bin from its storage bin.

8. In an apparatus for the manufacture of producer gas, a gas producer, a feed bin over said producer and spaced therefrom, a storage bin superposed on said feed bin, normally filled continuous feed chutes of considerable length leading from the feed bin to the producer, said feed bin having a capacity sufficient to feed the producer during a prolonged period of operation, and the feed chutes having a capacity sufficient to feed the producer during the period of refill of the feed bin from its storage bin, together with means for sealing the feed bin from the producer during its period of refill.

9. In combination with a gas producer, feed chutes opening through the head of the producer, an overhead feed bin, a storage bin superposed on said feed bin, said bins being supported from the producer by said feed chutes, valve means at the head of said chutes for sealing the latter from the feed bin and valve means at the top of the feed bin for sealing the latter from the superposed storage bin.

In testimony whereof I have signed my name to this specification.

ALBERT LEET GALUSHA.